United States Patent Office 3,097,214
Patented July 9, 1963

---

3,097,214
5-NITRO-2-FURYLAMIDOXIME
Anne Mary Von Esch, North Chicago, Ill., and William Reese Sherman, University City, Mo., assignors to Abbott Laboratories, North Chicago, Ill., a corporation of Illinois
No Drawing. Filed Oct. 19, 1961, Ser. No. 146,366
1 Claim. (Cl. 260—347.7)

This invention is directed to the compound of the formula

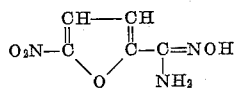

and a method for its preparation. This compound is a yellow, crystalline solid and is useful as an antifungal agent. When employed as an active, toxic constituent of disinfectant compositions either dispersed on an inert, finely divided solid or dispersed in water at a concentration of about 50 parts per million, the compound completely inhibits the growth of Chaetomium globosum, Myrothecium verrucaria and Alternaria species. The new compound is also an important intermediate in the preparation of derivatives possessing antibacterial properties. Thus, when 5-nitro-2-furylamidoxime is refluxed with acetyl chloride or benzoyl chloride there is obtained O-acetyl-5-nitro-2-furylamidoxime and O-benzoyl-5-nitro-2-furylamidoxime, respectively.

The novel compound of this invention can be conveniently prepared as described in the following example.

EXAMPLE 1

A mixture of 13.8 grams (0.10 mole) of 5-nitro-2-furylnitrile, 6.9 grams (0.10 mole) of hydroxylamine hydrochloride, 5.6 grams (0.10 mole) of potassium hydroxide and 500 ml. of ethanol was refluxed for 10 minutes. The solution was filtered to remove the potassium chloride formed and the filtrate was concentrated to about 300 ml. Upon cooling, the desired 5-nitro-2-furylamidoxime crystallized in the form of yellow needles which after recrystallization from ethanol melted at 177°–178° C. with decomposition.

*Analysis.*—Calculated for $C_5H_5N_3O_4$: C=35.09%; H=2.95%; N=24.56%. Found: C=35.01%; H=3.06%; N=24.68%.

Equally good results are obtained when the procedure described in the above example is carried out in other inert solvents such as methanol, propanol, butanol, acetone, ether or benzene and in the presence of other bases such as sodium hydroxide, sodium bicarbonate or sodium carbonate.

The 5-nitro-2-furylnitrile employed as a starting material is a known compound melting at 64° C. It can be easily prepared by heating equimolar amounts of 5-nitro-2-furylamide and phosphorous oxychloride at 100° C. until the evolution of hydrogen chloride ceases. The reaction mixture is then poured on ice and the solid which forms is filtered off and recrystallized from carbon tetrachloride.

We claim:
5-nitro-2-furylamidoxime.

References Cited in the file of this patent

Degering: Outline of Organic Nitrogen Compounds (1945), at page 506.